(12) United States Patent
Wu et al.

(10) Patent No.: US 8,769,256 B2
(45) Date of Patent: Jul. 1, 2014

(54) FAST SWITCHING BETWEEN MULTIPLE OPERATING SYSTEMS USING STANDBY STATE

(75) Inventors: Chin-Hwaun Wu, New Taipei (TW); Chung-Ching Huang, New Taipei (TW); Kuo-Han Chang, New Taipei (TW); Tai-Yu Lin, New Taipei (TW)

(73) Assignee: Via Technologies, Inc., New Taipei (TW)

( * ) Notice: Subject to any disclaimer, the term of this patent is extended or adjusted under 35 U.S.C. 154(b) by 279 days.

(21) Appl. No.: 13/110,098

(22) Filed: May 18, 2011

(65) Prior Publication Data

US 2012/0191961 A1     Jul. 26, 2012

(30) Foreign Application Priority Data

Jan. 26, 2011   (TW) .............................. 100102799 A (51) Int. Cl.
  *G06F 9/24*       (2006.01)
  *G06F 1/32*       (2006.01)
(52) U.S. Cl.
  USPC ................... 713/2; 712/1; 712/300; 712/320; 712/323; 712/324
(58) Field of Classification Search
  USPC .......................... 713/1, 2, 300, 320, 323, 324
  See application file for complete search history.

(56) References Cited

U.S. PATENT DOCUMENTS 6,938,175 B2 *   8/2005  Lee ............................... 713/320
7,831,850 B2 *  11/2010  LeProwse et al. ............ 713/320
7,886,136 B2 *   2/2011  Yoon ................................ 713/1
2003/0172313 A1  9/2003  Jain et al.
2005/0138442 A1 *  6/2005  Keller et al. .................. 713/300
2008/0162866 A1 *  7/2008  Siddiqi et al. ................. 711/173
2009/0063791 A1 *  3/2009  Cho ............................... 711/154
2010/0122077 A1 *  5/2010  Durham ......................... 713/100

(Continued)

FOREIGN PATENT DOCUMENTS

CN    1658185    8/2005
CN    1834916    9/2006
CN    101382833  3/2009
TW    200903266  1/2009

OTHER PUBLICATIONS

English language translation of abstract of CN 1834916 (published Sep. 20, 2006).
English language translation of abstract of CN 1658185 (published Aug. 24, 2005).

(Continued)

*Primary Examiner* — Vincent Tran
(74) *Attorney, Agent, or Firm* — McClure, Qualey & Rodack, LLP (57) ABSTRACT

An operating system switching method is provided. The operating system switching method is for a computer system comprising a control unit, a memory unit, and a storage unit, wherein the storage unit comprises a first operating system and a second operating system. The steps of the method include: loading the first operating system and the second operating system into a first memory space and a second memory space of the memory unit, respectively, and setting the first memory space and the second memory space to a working state and a standby state, respectively; and performing a first switching of the operating systems, and setting the first memory space and the second memory space to the standby state and the working state.

15 Claims, 4 Drawing Sheets

(56) References Cited

U.S. PATENT DOCUMENTS

| | | | |
|---|---|---|---|
| 2010/0257379 A1* | 10/2010 | Wang et al. | 713/300 |
| 2010/0325405 A1* | 12/2010 | Laue | 713/2 |
| 2011/0148923 A1* | 6/2011 | Sadowski et al. | 345/634 |
| 2011/0202778 A1* | 8/2011 | Zmudzinski et al. | 713/300 |
| 2011/0283071 A1* | 11/2011 | Yokoya et al. | 711/162 |

OTHER PUBLICATIONS

English language translation of abstract of CN 101382833 (published Mar. 11, 2009).

English language translation of abstract of TW 200903266 (published Jan. 16, 2009).

* cited by examiner

FAST SWITCHING BETWEEN MULTIPLE OPERATING SYSTEMS USING STANDBY STATE

CROSS REFERENCE TO RELATED APPLICATIONS

This Application claims priority of Taiwan Patent Application No. 100102799, filed on Jan. 26, 2011, the entirety of which is incorporated by reference herein.

BACKGROUND OF THE INVENTION

1. Field of the Invention

The present invention relates to computer systems, and in particular relates to computer systems with multiple operating systems, which allows rapid switching between operating systems, thus consuming less power.

2. Description of the Related Art

For conventional computer systems (e.g. computer systems with Microsoft Windows operating system), power management for reducing power consumption can be achieved by using the standby states defined by the "Advanced Configuration and Power Interface (ACPI)". There are six states S0 to S5 defined by the ACPI. State S0 indicates that the computer system is at working state. In the standby state S1, the CPU in the computer system is not working, and in the standby state S2, the CPU in the computer system shutdowns. State S3 is a standby state with a short resuming time (e.g. 5 seconds or shorter), wherein a computer system can be recovered to the working state (e.g. state S0). The standby state S4 is also regarded as a "suspend to disk" state, and the computer system has low power consumption and long resuming time (e.g. 20 seconds or longer) in the standby state S4. The aforementioned standby states S1 to S4 save power in different levels, and state S5 is a shutdown state.

On the other hand, current computer systems or hand-held devices may be installed with two operating systems, such as a Windows operating system and an Android system, according to user demands. To switch between the two installed operating systems, an appropriate switching mechanism is needed. There are two kinds of popular operating system switching mechanisms. The first switching mechanism is "rebooting", which switches from one operating system to another operating system. For example, several operating systems are installed on a personal computer, such as a Windows Vista, Windows 7, and Linux operating system, and a user can switch between the installed operating systems by rebooting. However, the rebooting process requires the whole computer system to be in a shutdown state (e.g. S5) from the working state (e.g. S0), and then re-enter the working state (e.g. S0), such that it takes a very long time to switch between operating systems. The second switching mechanism uses virtualization technology. However, to switch between two operating systems by virtualization, the computer system must support two operating systems concurrently. Here, the original operating system is still at a working state (e.g. S0) when switching to another operating system. A user does not know the operating system behind is still operating with proper design. Also, more power is consumed as two operating systems must be executed by a processor; especially for devices which have slower processors, like mobile devices. Therefore, a computer system which is capable of switching between two operating systems rapidly without consuming a lot of power is highly demanded.

BRIEF SUMMARY OF THE INVENTION

A detailed description is given in the following embodiments with reference to the accompanying drawings.

An operating system switching method is provided. The operating system switching method is for a computer system comprising a control unit, a memory unit, and a storage unit, wherein the storage unit comprises a first operating system and a second operating system. The steps of the method include: loading the first operating system and the second operating system into a first memory space and a second memory space of the memory unit, respectively, and setting the first memory space and the second memory space to a working state and a standby state, respectively; and performing a first switching of the operating systems, and setting the first memory space and the second memory space to the standby state and the working state, respectively.

A computer system is further provided. The computer system comprises: a control unit; a memory unit having a first memory space for a first operating system and a second memory space for a second operating system, respectively; a storage unit storing the first operating system and the second operating system; and a processor for loading the first operating system and the second operating system into the first memory space and the second memory space, respectively, setting the first memory space and the second memory space to a working state and a standby state, respectively, and performing a switching for the first operating system and the second operating system to set the first memory space and the second memory space to the standby state and the working state, respectively, according to a switching signal.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the contemplated mode of carrying out the invention. This description is made for the purpose of illustrating the general principles of the invention and should not be taken in a limiting sense. The scope of the invention is determined by reference to the appended claims.

Figure 1:
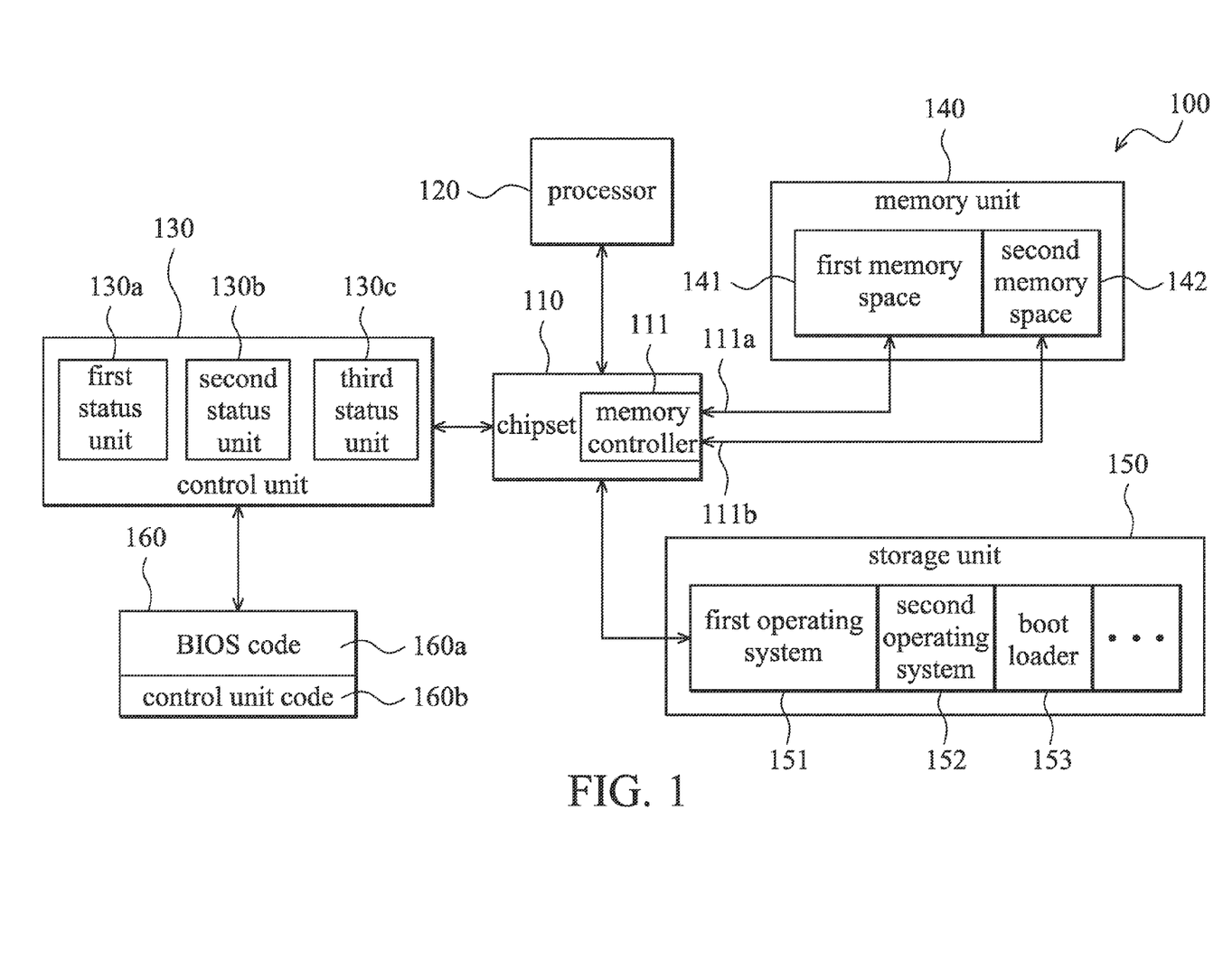
FIG. 1 illustrates a block diagram of a computer system with multiple operating systems according to an embodiment of the invention.

FIG. 1 illustrates a block diagram of the computer system 100 with multiple operating systems according to an embodiment of the invention. The computer system 100 at least comprises a chipset 110, a processor 120, a control unit 130, a memory unit 140, and a storage unit 150. In one embodiment, the computer system 100 can be a personal computer, a hand-held device, or a smart phone. In another embodiment, the computer system 100 further comprises a read-only memory 160, which is electrically coupled to the control unit 130. The read-only memory 160 further comprises a basic input/output system (BIOS hereafter) code 160a and a control unit code 160b. The BIOS code 160a controls the core mechanism of the booting procedure. Usually, the processor 120 executes the BIOS code 160a stored in the read-only memory 160 when the computer system 100 boots up. Similarly, the control unit 130 also executes specific instructions according to the control unit code 160b.

The chipset 110 is electrically coupled between the processor 120, the control unit 130 and the memory unit 140, for transmitting control signals of various components of the computer system 100. In one embodiment, the chipset 110 can be an integrated chip of both a north bridge and a south bridge, or a south bridge chip. The chipset 110 further comprises a memory controller 111 to control the memory unit 140, such as a DRAM controller. The memory controller 111 further comprises a first channel 111a and a second channel 111b to control different address spaces in the memory unit 140.

The processor 120 controls each component of the computer system 100 through the chipset 110. Moreover, for example, the control unit 130 can be an embedded controller (EC), and the control unit code 160b can be an embedded controller code (EC code). The control unit 130 further comprises a first status unit 130a, a second status unit 130b, and a third status unit 130c. The status units, such as registers or flags, are for recording corresponding booting and operating system switching messages.

The memory unit 140 can be a volatile memory, such as a DRAM or a cache memory. In the embodiment, the memory unit 140 comprises a first memory space 141 and a second memory space 142 of different addresses, which are used to be loaded with different operating systems. In the embodiment, the first channel 111a and the second channel 111b in the memory controller 111 control the first memory space 141 and the second memory space 142 in the memory unit 140, respectively. It should be noted that in the present invention only one of the first memory space 141 and the second memory space 142 keeps in the working state, while the other one keeps in the standby state after booting up the computer system 100. That is, in the same time period, the first memory space 141 and the second memory space 142 are in different power states. Similarly, the first channel 111a and the second channel 11b are with the same power states corresponding to the first memory space 141 and the second memory space 142, respectively. Therefore, compared with prior technologies, which use virtualization to switch between multiple operating systems and all of the operating systems are still in the working state, the computer system 100 of the invention saves more power.

The storage unit 150 stores at least a first operating system 151 and a second operating system 152, such as a non-volatile memory (e.g. a flash memory or a hard-disk), but the invention is not limited thereto. The storage unit 150 further comprises a boot loader 153, which presets various booting environments required by the operating systems before loading the operating systems, and assists for loading of the operating systems. It should be noted that, in the embodiment, two operating system systems are taken for example, but the invention is not limited thereto. As long as there are sufficient channels in the memory controller 111 to control different address spaces in the memory unit 140, respectively, the invention can be applied to a computer system with more than two operating systems.

It is worth mentioning that the first operating system 151 and the second operating system 152 are loaded into in the first memory space 141 and the second memory space 142 of different address, respectively, during the booting procedure of an application. In an embodiment, the division for different address spaces in the memory unit 140 is set by a BIOS code 160a. For example, before assembling the computer system 100, the corresponding messages to preset how to distribute the address spaces in the memory unit 140 can be written into the BIOS code 160a. Alternatively, a user may freely set the address spaces in the memory unit 140 and write the address settings into the BIOS code 160a. When the computer system 100 boots up, the processor 120 reads the BIOS code 160a, which is stored in the read-only memory 160 through the chipset 110 and the control unit 130, to divide the different address spaces in the memory unit 140. Further, when the processor reads the BIOS code 160a with the corresponding division information (e.g. the demands of the memory spaces for executing the first operating system 151 and the second operating system 152), the processor 120 can divide address spaces in the memory unit 140 according to the demands of memory spaces for executing different operating systems. For example, the file size of a Windows 7 operating system is much larger than an Android operating system, and hence the distributed address space in the memory unit 140 for the Windows 7 operating system is larger than that for an Android system, but the invention is not limited thereto.

In addition, in order to switch between multiple operating systems rapidly, the control unit 130 can provide sufficient information while being booted and switch operating systems via the first status unit 130a, the second status unit 130b, and the third status unit 130c. The first status unit 130a has corresponding information of which operating system is to be used, and this information is used by the BIOS or the boot loader 153. For example, if the first status unit 130a has a 2-bit data and the possible conditions are: "00", "01" and "10". The condition "00" may indicate manual user settings. When the condition is "00", the system will display a menu for the user to select and set. The condition "01" may indicate that the first operating system is in use now, such as a Windows 7 operating system. The condition "10" indicates that the second operating system is in use now, such as an Android operating system. The second status unit 130b has the corresponding information of auto-resuming the memory spaces, and this information is used by the control unit 130. For example, if the second status unit 130b has 1-bit data, then the possible conditions are "0" and "1", wherein the condition "0" may indicate auto-resuming and the condition "1" may indicate non-auto-resuming. The third status unit 130c has corresponding information of a first time of a booting operation, and this information is used by the BIOS. The aforementioned status units are taken for example, and are not to limit the invention. In other embodiments, if there are more than two operating systems, the number and parameters of the status units can be adjusted and set according to demand of users.

Figure 2:
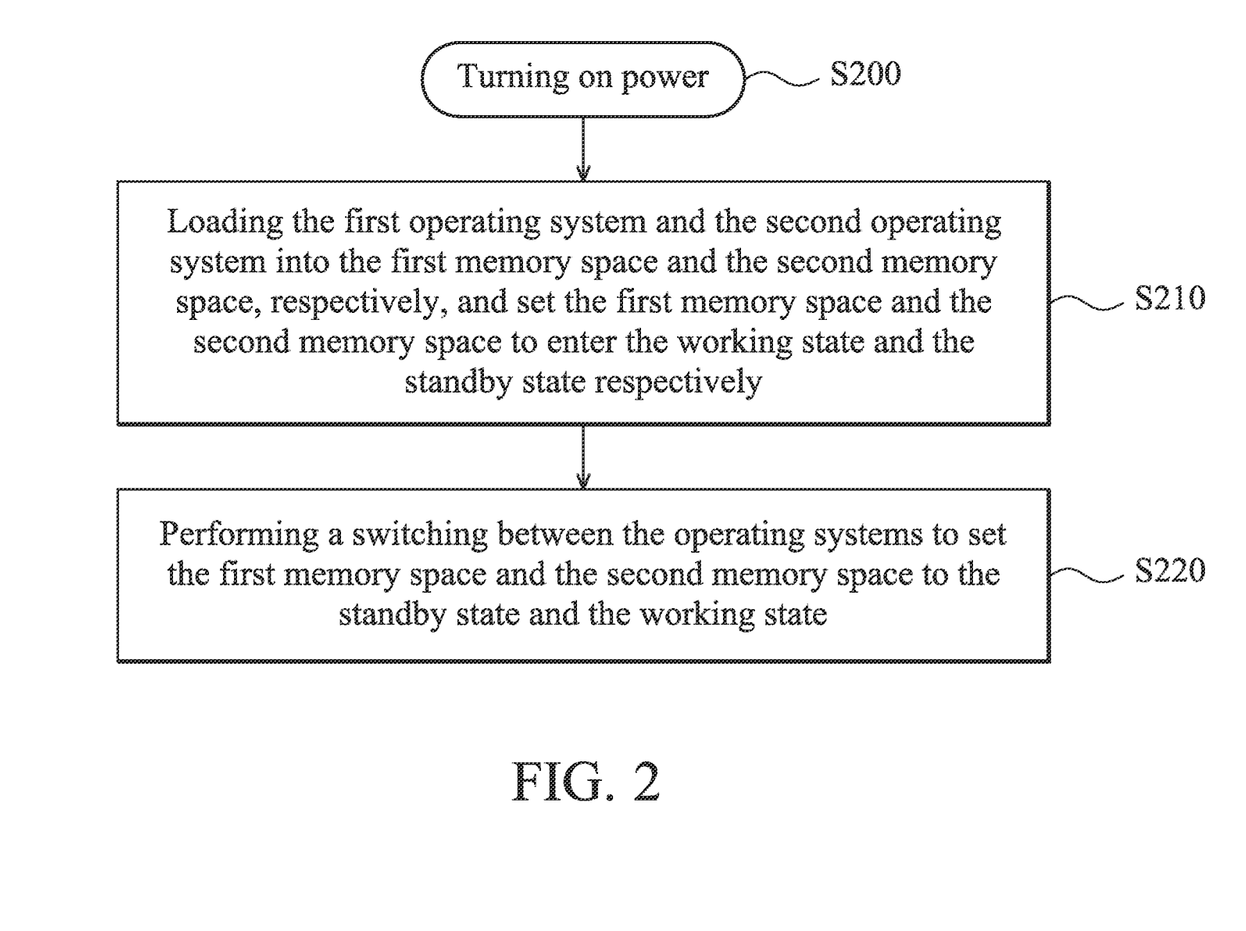
FIG. 2 illustrates a flow chart of a computer system with multiple operating systems according to an embodiment of the invention.

FIG. 2 illustrates a flow chart for a computer system with multiple operating systems when booting and switching operating systems according to an embodiment of the invention. Referring to FIG. 1 and FIG. 2, in step S200, the power of the computer system is turned on. In step S210, the first operating system 151 and the second operating system 152 are loaded into the first memory space 141 and the second memory space 142, respectively, and the first memory space 141 and the second memory space 142 are in the working state and the standby state, respectively. In step S210, the processor 120 reads the BIOS code 160a through the chipset 110 and the control unit 130 when the computer system 100 enters the booting procedure. Because the BIOS code 160a of the invention has information for dividing the memory unit 140, not only other components are initialized by the BIOS code 160a, the BIOS code 160a also completes the division of address spaces in the memory unit 140, so that the first memory space 141 and the second memory space 142 have different addresses in the memory unit 140. Furthermore, during the booting procedure, the processor 120 sets the memory controller 111 in the chipset so as to the first channel 111*a* and the second channel 111*b* can control the first memory space 141 and the second memory space 142, respectively. The first operating system 151 and the second operating system 152 are loaded into the first memory space 141 and the second memory space 142, respectively, after initialization. Also, the first memory space 141 and the second memory space 142 are respectively in the working state and the standby state by setting the status units 130*a*, 130*b*, or 130*c* in the control unit 130. In the embodiment, the second memory space 142 is supplied with power though in the standby state, such as state S3 defined by ACPI, and the second channel 111*b* in the memory controller 111 is also in standby state. However, the power consumption is less in the standby state then in the working state. In addition, the working state, for example, is state S0 defined by ACPI.

In step S220, the operating systems are switched, so that the first memory space 141 and the second memory space 142 are in the standby state and the working state, respectively. In step S220, because the status units 130*a*, 130*b*, or 130*c* in the control unit 130 have corresponding information of booting and operating system switching, the processor 120 and the control unit 130 can perform switching between multiple operating systems according to the setting values of the status units 130*a*, 130*b*, or 130*c*. It should be noted that switching between multiple operating systems is performed when the first memory space 141 and the second memory space 142 are supplied with power, such as switching the first memory space 141 and the second memory space 142 between state S0 and S3 defined by ACPI. Further, the first memory space 141 and the second memory space 142 are in the state S0 and state S3, respectively, but they are both supplied with power of different level. Therefore, compared with prior technologies of switching between multiple operating systems by rebooting, the computer system of the invention can switch between operating systems more rapidly.

Figure 3:
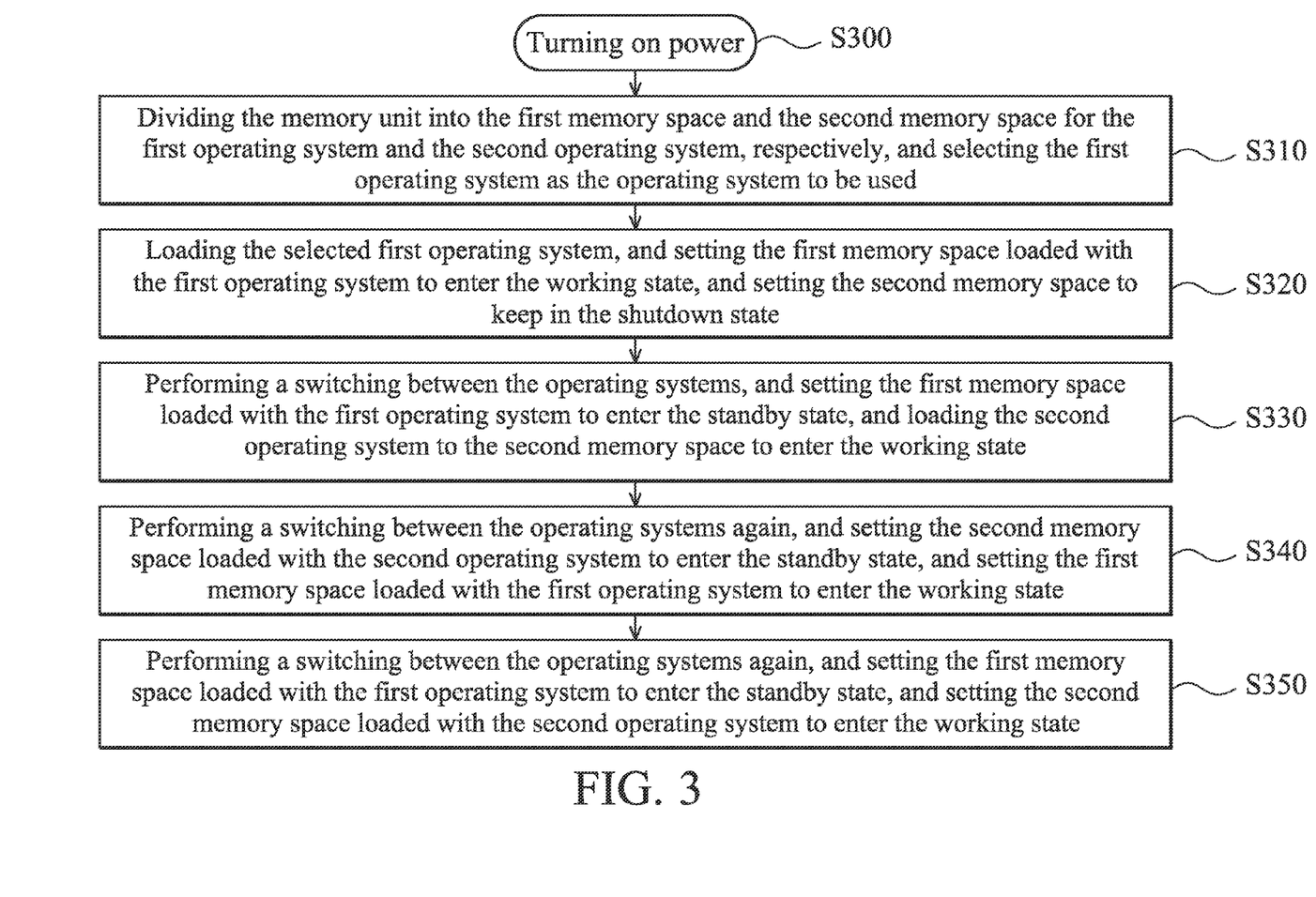
FIG. 3 illustrates a flow chart of a computer system with multiple operating systems according to another embodiment of the invention.

FIG. 3 illustrates a flow chart for a computer system having multiple operating systems when booting and switching the operating systems according to an embodiment of the invention. Referring to FIG. 1 and FIG. 3, in step S300, the power of the computer system is turned on. In step S310, the memory unit 140 is divided into the first memory space 141 and the second memory space 142 for the first operating system 151 and the second operating system 152, respectively, and the first operating system 151 is selected as the operating system to be used. In step S310, the division of the memory unit 140 and the settings of the first channel 111*a* and the second channel 111*b* in the memory controller 111 are similar to step S210, thus, the details will not be described here.

On the other hand, the first status unit 130*a* in the control unit 130 can be used to select the operating system to be used, wherein the first status unit 130*a*, for example, is a register or a flag. In an embodiment, assuming that the first status unit 130*a* has a 2-bit data, a vendor or a user can set the default value (e.g. "00") of the first status unit 130*a* in advance, so that the user can select and save the operating system (e.g. Windows 7 or Android) which he/she want to use. In another embodiment, the vendor or the user can set the default operating system to be used in advance. Meanwhile, the first status unit 130*a* has information for which the operating system is to be used. When the power of the computer system 100 is turned on, the loading steps for booting the default operating systems can be performed without selection.

In step S320, the first operating system 151 selected is loaded, so that the first memory space 141 loaded with the first operating system 151 is in the working state, and the second memory space 142 is kept in the shutdown state, wherein the working state is state S0 defined by ACPI, and the shutdown state is state S5 defined by ACPI. In step S320, the boot loader 153 loads the first operating system 151 in the storage unit 150 into the first memory space 141 in the memory unit 140 according to the setting value of the first status unit 130*a* (e.g. the setting value is "01" for a Windows 7 operating system). Meanwhile, the first memory space 141 is in the working state, and a user can start to operate the computer system 100 because the first operating system 151 is loaded. On the other hand, when the user uses the first operating system in the computer system 100, the second memory space 142 is still in the shutdown state. Thus, when the user wants to switch to another operating system (e.g. an Android operating system), the following steps will be performed.

In step S330, the operating systems are switched, so that the first memory space 141 loaded with the first operating system 151 enters the standby state, and the second operating system 152 is loaded into the second memory space 142 to enter the working state. It should be noted that, the first memory space 141 is supplied with less power than in the working state when switching to the standby state. Meanwhile, the first memory space 141 is in state S3 defined by ACPI. On the other hand, to switch operating systems, a user can press a switching button or set a menu to generate a switching signal to perform step S330. At the same time, the setting value of the first status unit 130*a* in the control unit 130 is modified to another value (e.g. setting value "10" for an Android operating system) indicating one of the operating systems to be used (e.g. the second operating system 152) according to user selection, so that the boot loader 153 will load the second operating system 152 into the second memory space 142 according to the setting value in the first status unit 130*a*, and hence set the second memory space 142 to enter the working state. Accordingly, both of the first operating system 151 and the second operating system 152 are loaded into the memory unit 140, but with different power states. If the user wants to switch operating systems again, the following steps will be performed.

In step S340, the operating systems are switched again, so that the second memory space 142 loaded with the second operating system 152 enters the standby state, and the first memory space 141 loaded with the first operating system 151 enters the working state. Particularly, when the second memory space 142 enters the standby state due to the switching signal, the second memory space 142 is still supplied with less power than in the working state, and the second memory space 142 is in state S3 defined by ACPI. On the other hand, the first operating system 151 and the second operating system 152 can be switched according to the setting values of the first status unit 130*a* and the second status unit 130*b* in the control unit 130, wherein the status units 130*a* and 130*b*, for example, are registers or flags. In the embodiment, the first status unit 130*a* has information for indicating which operating system is to be used. The second status unit 130*b* has information for auto-resuming the memory space (e.g. the first memory space 141 or the second memory space 142). Specifically, when multiple operating systems are all loaded into the memory unit 140 with different power level, the information in the second status unit 130*b* will indicate whether the be-used operation system is auto-resuming. In particular, when a user wants to switch between the operating systems, the user can press a switching button or set a selection menu to generate a switching signal to perform step S340. Meanwhile, the setting value of the first status unit 130a will be modified to the another value indicating one of the operating systems to be used (e.g. the first operating system 151), and the setting value of the second status unit 130b will be modified to the another value indicating auto-resuming the memory space where the operating system have loaded (e.g. setting value "0" is auto-resuming) according to user selection, so that the first memory space 141 rapidly switches from the standby state to the working state again because the BIOS reads the setting value of the first status unit 130a (e.g. setting value "01" is the Windows 7 operating system) and the control unit 130 reads the setting value of the second status unit 130b (e.g. setting value "0" is auto-resuming).

Then, if the user wants to switch between the operating systems again, step S350 will be performed, so that the first memory space 141 loaded with the first operating system 151 enters the standby state, and the second memory space 142 loaded with the second operating system 152 enters the working state. In step S350, the second memory space 142 can enter the working state from the standby state according to the setting values of the first status unit 130a and the second status unit 130b in the control unit 130. The detailed description of step S350 is similar to step S340, and will not be described here. Later, if the user wants to switch between the first and second operating systems, steps S340 and S350 can be performed.

Because the corresponding memory spaces storing multiple operating systems have different power states, respectively, the computer system 100 of the invention saves more power when compared with the memory spaces in prior technologies using virtualization wherein all of the memory spaces are in the working state. The multiple operating systems loaded into corresponding memory spaces of the invention are switched between the standby state and the working state, and hence the computer system of the invention can switch between operating systems more rapidly when compared with prior technologies which switch between operating systems by using re-booting after shutdown.

Figure 4:
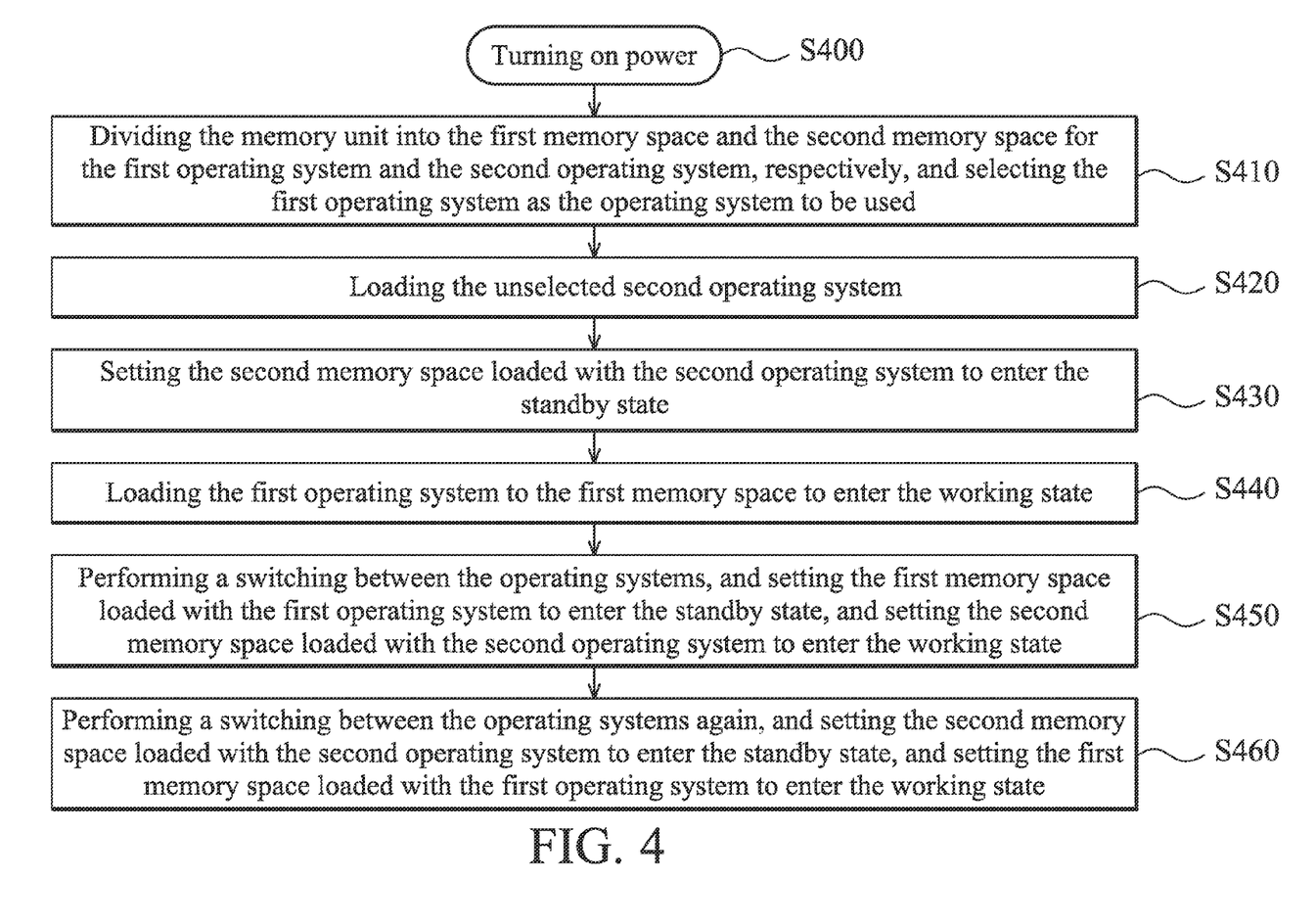
FIG. 4 illustrates a flow chart of a computer system with multiple operating systems according to yet an embodiment of the invention.

FIG. 4 illustrates a flow chart for a computer system with multiple operating systems when booting and switching operating systems according to an embodiment of the invention. Referring to FIG. 1 and FIG. 4, in step S400, the power of the computer system 100 is turned on. In step S410, the memory unit 140 is divided into the first memory space 141 and the second memory space 142 for the first operating system 151 and the second operating system 152, respectively, and the first operating system is chosen as the operating system to be used. The detailed description of step S410 is similar to step S310, thus, it will not be described here.

In step S420, the second operating system 152, which is not selected, is loaded. In step S420, the boot loader 153 loads the second operating system 152 into the second memory space 142. It should be noted that, although the first status unit 130a in the control unit 130 has information for indicating using the first operating system 151, however, the second operating system 152 is loaded in step S420 before the first operating system is loaded (step S440). That is, in the embodiment, the information in the first status unit 130a for indicating which operating system is to be used, actually indicates that all of the steps S420, S430 and S440 should be performed orderly. After step S420 is performed, the second memory space 142 is in the working state, and the first memory space 141 is still in the shutdown state, wherein the working state is state S0 defined by ACPI, and the shutdown state is state S5 defined by ACPI.

In step S430, the second memory space 142 loaded with the second memory space 142 enters the standby state. When the second memory space 142 enters the standby state (e.g. state S3 defined by ACPI), the computer system 100 still supplies power to the second memory space 142, but less power than in the working state. In addition, the first memory space 141 is still in the shutdown state, wherein the shutdown state is state S5 defined by ACPI.

In step S440, the first operating system 151 is loaded into the first memory space 141, so that the first memory space 141 enters the working state. It should be noted that in step S440, the first operating system 151 is to be loaded by user's or menu setting, and the information indicating using the first operating system 151 as the operating system is in the first status unit 130a of the control unit 130. Specifically, in the embodiment, the setting value of the first status unit 130a in the control unit 130 indicating using the first operating system 151 (e.g. step S410). However, the second operating system 152 is the first one to be loaded (e.g. step S420). The step S420 seems to conflict with the setting value of the first status unit 130a, but the setting process for setting value of the first status unit 130a doesn't finish until the following steps S430 and S440 are performed. In detail, the first operating system 151 to be used is loaded until the step S440, which matches the setting value of the first status unit 130a. In step S440, after the boot loader 153 loads the first operating system 151 into the first memory space 141, the first memory space 141 enters the working state, such as state S0 defined by ACPI. In addition, the second memory space 142 is in the standby state, such as state S3 defined by ACPI. That is, both of the first operating system 151 and the second operating system 152 are loaded into the first memory space 141 and the second memory space 142, respectively, wherein the first memory space 141 and the second memory space 142 is in the working state and the standby state, respectively, so that a user can start operate the computer system 100. Then, if a user wants to switch between operating systems, the following steps will be performed.

In step S450, the operating systems are switched, so that the first memory space 141 loaded with the first operating system 151 enters the standby state, and the second memory space 142 loaded with the second operating system enters the working state. Specifically, when the first memory space 141 enters the standby state due to the switching signal, the computer system 100 still supplies less power to the first memory space 141. For example, the first memory space 141 is in state S3 defined by ACPI. On the other hand, the first operating system 151 and the second operating system 152 can be switched by referring to the setting values of the first status unit 130a, the second status unit 130b, and the third status unit 130c, wherein the status units 130a, 130b, and 130c, for example, are registers or flags. In the embodiment, the first status unit 130a and the second status unit 130b are similar to the status units described in step S340, thus, they will not be described here. In addition, it should be noted that the selected operating system is not loaded while the computer system 100 is being booted (e.g. in the step S420, the loaded operating system is different from the setting value of the first status unit 130a), while selected operating system consists with the setting value of the first status unit 130a in step S450. To prevent errors from occurring during execution, in the embodiment, the third status unit 130c is deployed for storing information of whether this time is the first time for booting. In particular, when a user wants to switch between the operating systems, the user can press a switching button or set a selection menu to generate a switching signal to perform step S450. In the step S450, the control unit 130 reads the setting value of the second status unit 130b (e.g. setting value "0" is auto-resuming) and the BIOS reads the setting value of the third status unit 130c (e.g. setting value "1" is not the first time for booting), so that the second memory space 142 can enter the working state from the standby state again.

Then, if the user wants to switch between the operating systems again, step S450 is performed to switch between the operating systems, so that the first memory space 141 loaded with the first operating system 151 enters the working state. In step S460, the first memory space 141 enters the working state from the standby state according to the setting values of the first status unit 130a, the second status unit 130b, and the third status unit 130c in the control unit 130. The detailed description of step S460 is similar to that of step S450, thus, it will not be described here. Later, if the user wants to switch between the two operating systems, steps S450 and S460 are performed.

It is worth mentioning that the difference between FIG. 3 and FIG. 4 is that, referring to the embodiment of FIG. 3, the first operating system 151 selected to be used is first loaded to use in the computer system 100 until being switched to the second operating system 152, whereafter, the second operating system 152 is loaded. When both the first operating system 151 and the second operating system 152 are loaded, the follow-up switching between the two operating systems can be a direct switching operation without loading the operating systems again. On the other hand, referring to the embodiment of FIG. 4, both of the first operating system 151 and the second operating system 152 are loaded before a user uses the computer system 100. Similarly, when the first operating system 151 and the second operating system 152 are loaded, the follow-up switching between the two operating systems can be a direct switching operation without loading the operating systems again.

Because the corresponding memory spaces of multiple operating systems have different power states in the invention, and the computer system saves more power when compared with prior technologies using virtualization with all memory spaces in the working state. The multiple operating systems of the invention are switched between the standby state and the working state (i.e. the memories are supplied with power) of the corresponding memory spaces. Therefore, the computer system of the invention can switch between operating systems more rapidly when compared with prior technologies to switch between the operating systems by shutdown followed by re-booting.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An operating system switching method, for a computer system comprising a control unit, a memory unit, and a storage unit, wherein the storage unit comprises a first operating system and a second operating system, comprising:

dividing the memory unit into a first memory space and a second memory space according to demands of memory spaces for executing the first operating system and the second operating system;

loading the first operating system and the second operating system into the first memory space and the second memory space of the memory unit, respectively, and setting the first memory space and the second memory space to a working state and a standby state, respectively; and performing a first switching of the operating systems, and setting the first memory space and the second memory space to the standby state and the working state, respectively, wherein the computer system further comprises a memory controller having a first channel and a second channel to control the first memory space and the second memory space, respectively, wherein the first channel and the second channel are supplied with power of different levels, and power states of the first channel and the second channel are identical to the corresponding power states of the first memory space and the second memory space, respectively, wherein the control unit further comprises a first status unit with a setting value of auto-resuming the memory space, and wherein the control unit further comprises a second status unit with a setting value of a first time of a booting operation.

2. The method as claimed in claim 1, wherein the working state is state S0 defined by ACPI, and the standby state is state S3 defined by ACPI, and the first switching indicates that the power state of the second memory space is switched from the state S3 to the state S0.

3. The method as claimed in claim 1, wherein before the step of loading the first operating system and the second operating system into the first memory space and the second memory space of the memory unit, respectively, comprises:

dividing the memory unit into the first memory space for the first operating system and the second memory space for the second operating system with a BIOS program code.

4. The method as claimed in claim 1, wherein the step of loading the first operating system and the second operating system into the first memory space and the second memory space of the memory unit, respectively, comprises:

turning on the power of the computer system;

dividing the memory unit into the first memory space and the second memory space;

loading the first operating system into the first memory space to set the first memory space to enter the working state, and keep the second memory space at a shutdown state;

performing a second switching to set the first memory space to enter the standby state, and loading the second operating system into the second memory space to set the second memory space to enter the working state; and performing a third switching to set the first memory space to enter the working state and the second memory space to enter the standby state.

5. The method as claimed in claim 4, further comprising: a user using the first operating system of the computer system after the first operating system is loaded into the first memory space and before the second switching is performed.

6. The method as claimed in claim 1, wherein the step of loading the first operating system and the second operating system into the first memory space and the second memory space of the memory unit further comprise:

turning on the power of the computer system;

dividing the memory unit into the first memory space and the second memory space;

loading the second operating system into the second memory space to set the second memory space to enter the working state and keep the first memory space at a shutdown state; and setting the second memory space loaded with the second operating system to enter the standby state, and loading the first operating system into the first memory space to set the first memory space to enter the working state.

7. The method as claimed in claim 6, further comprising: a user using the first operating system of the computer system after the first operating system is loaded into the first memory space and before the first switching is performed.

8. The method as claimed in claim 1, wherein the control unit is an embedded controller.

9. A computer system, comprising:
a control unit;
a memory unit having a first memory space for a first operating system and a second memory space for a second operating system, respectively;
a storage unit storing the first operating system and the second operating system; and
a processor for dividing the memory unit into the first memory space and the second memory space according to demands of memory spaces for executing the first operating system and the second operating system, loading the first operating system and the second operating system into the first memory space and the second memory space, respectively, setting the first memory space and the second memory space to a working state and a standby state, respectively, and performing a switching for the first operating system and the second operating system to set the first memory space and the second memory space to the standby state and the working state, respectively, according to a switching signal,
wherein the computer system further comprises a memory controller having a first channel and a second channel to control the first memory space and the second memory space, respectively, wherein the first channel and the second channel are supplied with power of different levels, and power states of the first channel and the second channel are identical to the corresponding power states of the first memory space and the second memory space, respectively, wherein the control unit further comprises a first status unit with a setting value of auto-resuming the memory space, and wherein the control unit further comprises a second status unit with a setting value of a first time of a booting operation.

10. The computer system as claimed in claim 9, wherein the working state is state S0 defined by ACPI, and the standby state is state S3 defined by ACPI, and the switching indicates the power state of the second memory space is switched from the state S3 to the state S0.

11. The computer system as claimed in claim 9, wherein the control unit is an embedded controller.

12. The computer system as claimed in claim 9, wherein the control unit determines whether to auto-resume the second memory space to enter the working state according to the switching signal and the setting value of the second status unit when the second memory space loaded with the second operating system is in the standby state.

13. The computer system as claimed in claim 9, further comprises a BIOS code for dividing the memory unit into the first memory space and the second memory space.

14. The computer system as claimed in claim 9, wherein the control unit further comprises a status unit with a setting value indicating which operating system is to be used.

15. The computer system as claimed in claim 14, wherein the switching signal is generated by pressing a switching button or setting a selection menu, and the processor modifies the setting value of the first status unit when receiving the switching signal to switch between the operating systems.

* * * * *